J. B. FOOTE.
FRUIT PITTING MACHINE.
APPLICATION FILED MAY 26, 1910.
1,024,564.
Patented Apr. 30, 1912.
4 SHEETS—SHEET 1.
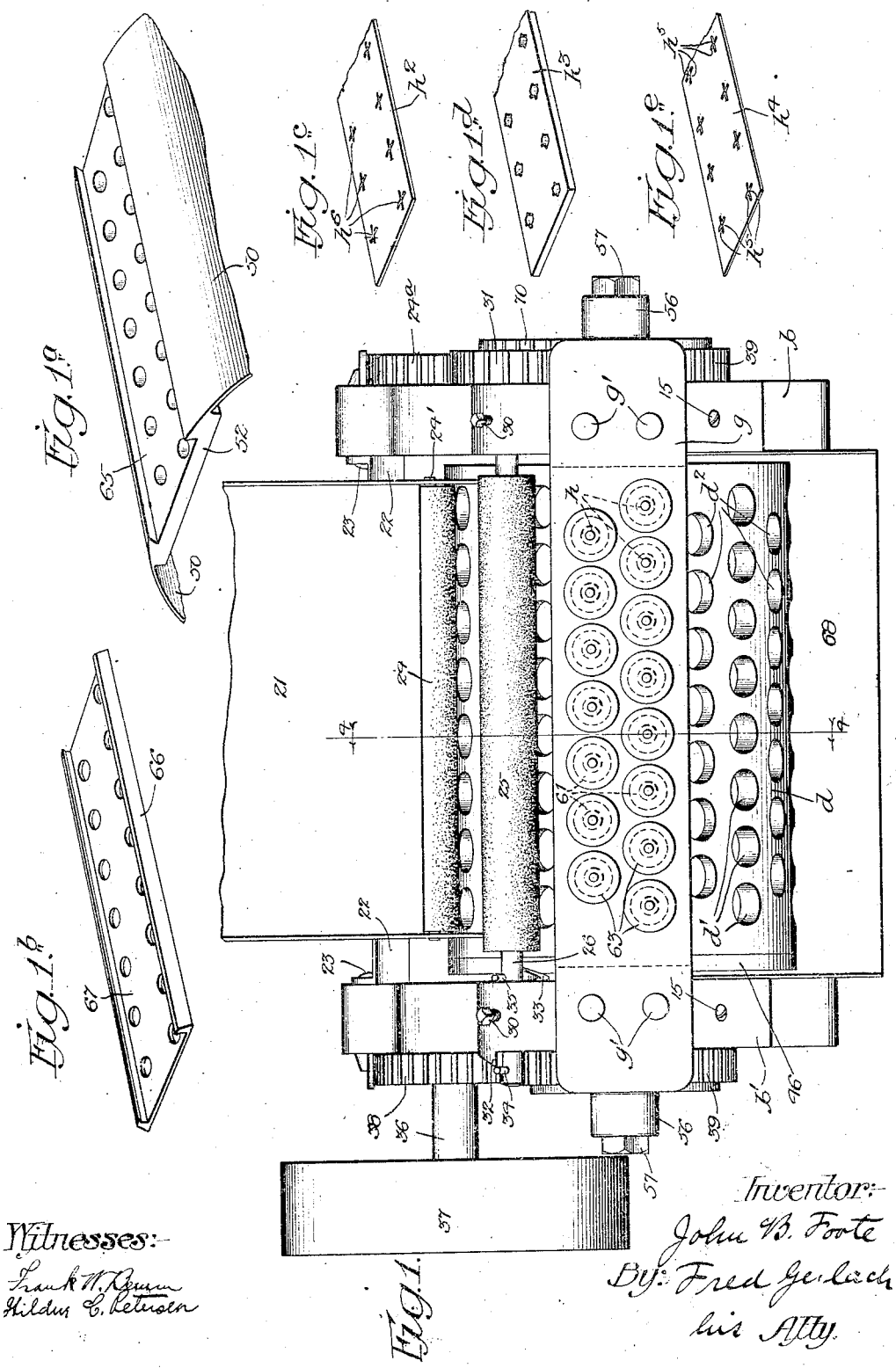

J. B. FOOTE.
FRUIT PITTING MACHINE.
APPLICATION FILED MAY 26, 1910.
1,024,564.
Patented Apr. 30, 1912.
4 SHEETS—SHEET 2.
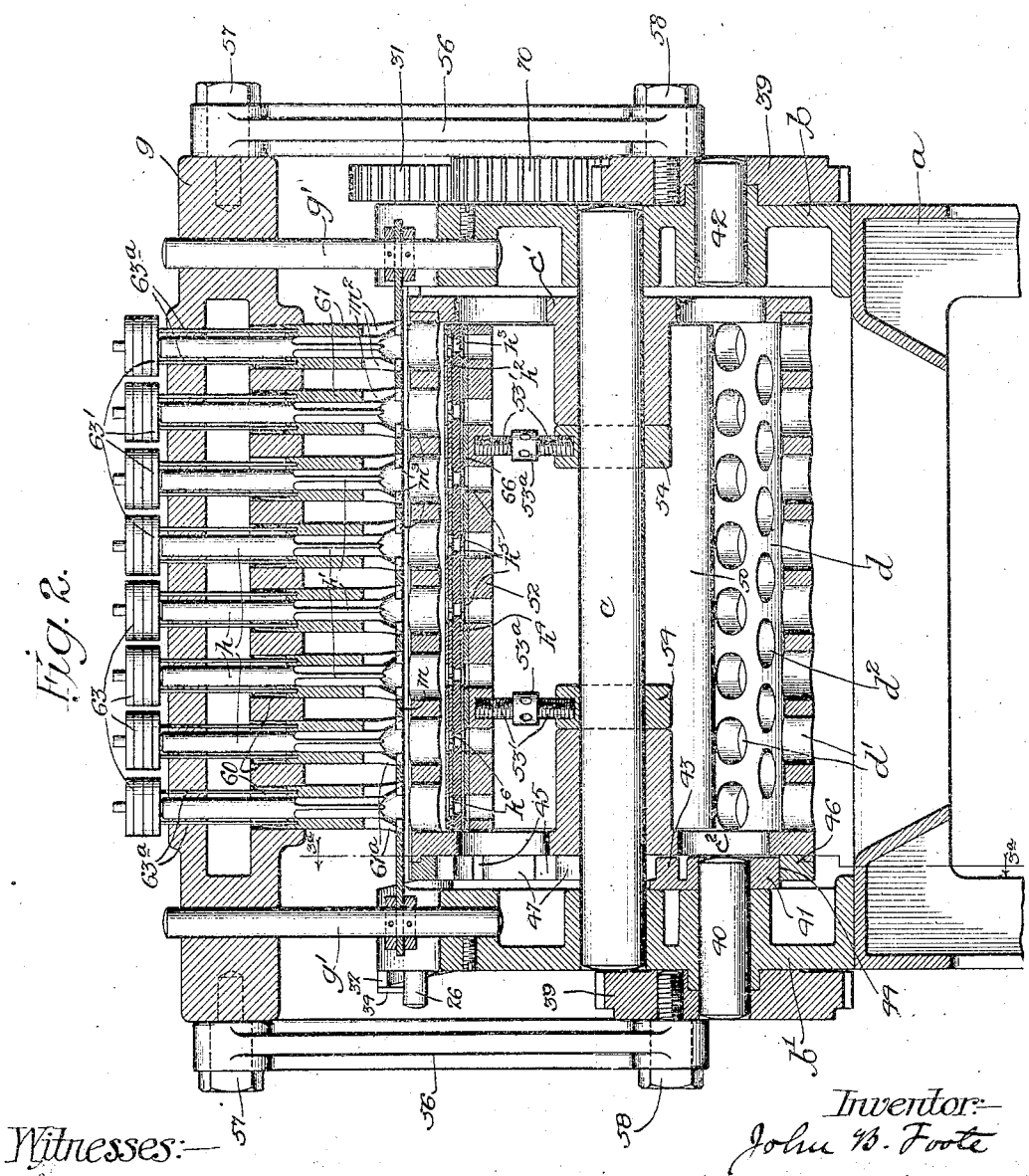

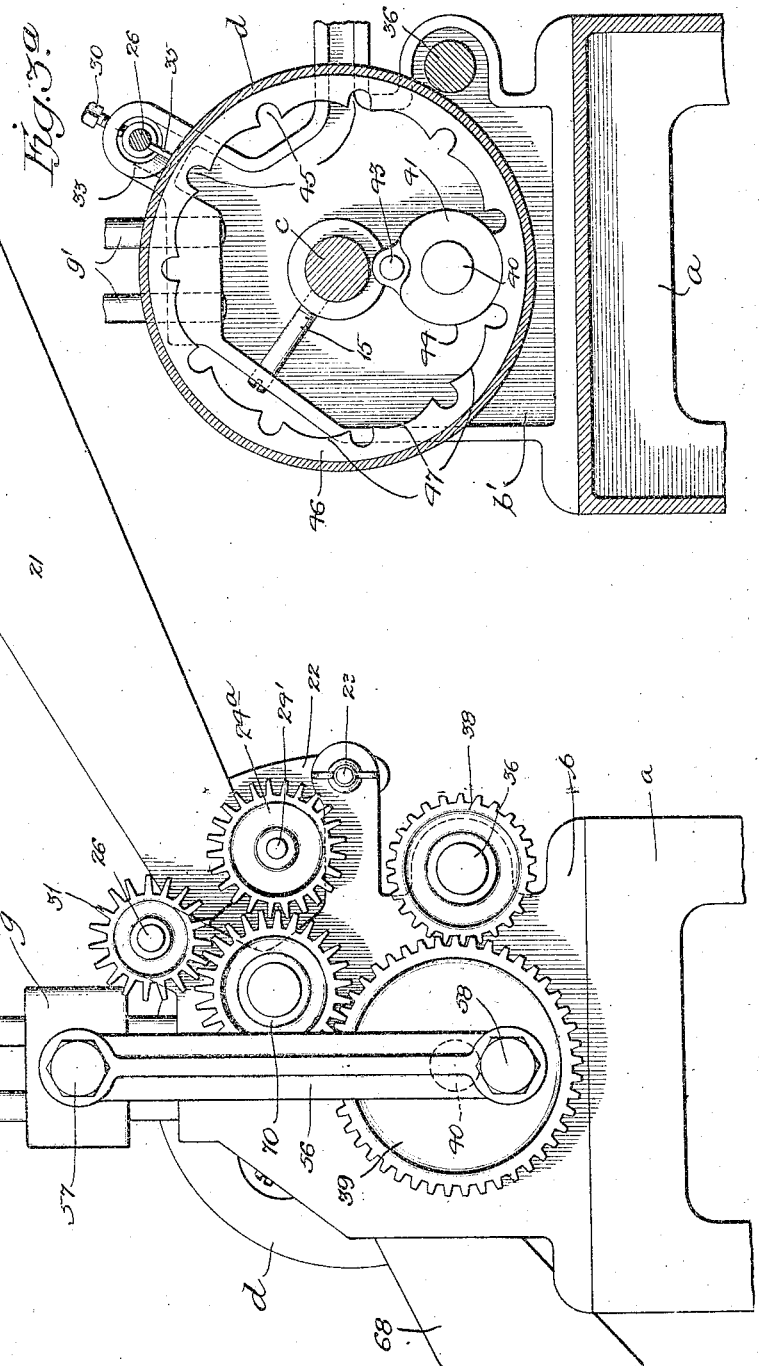

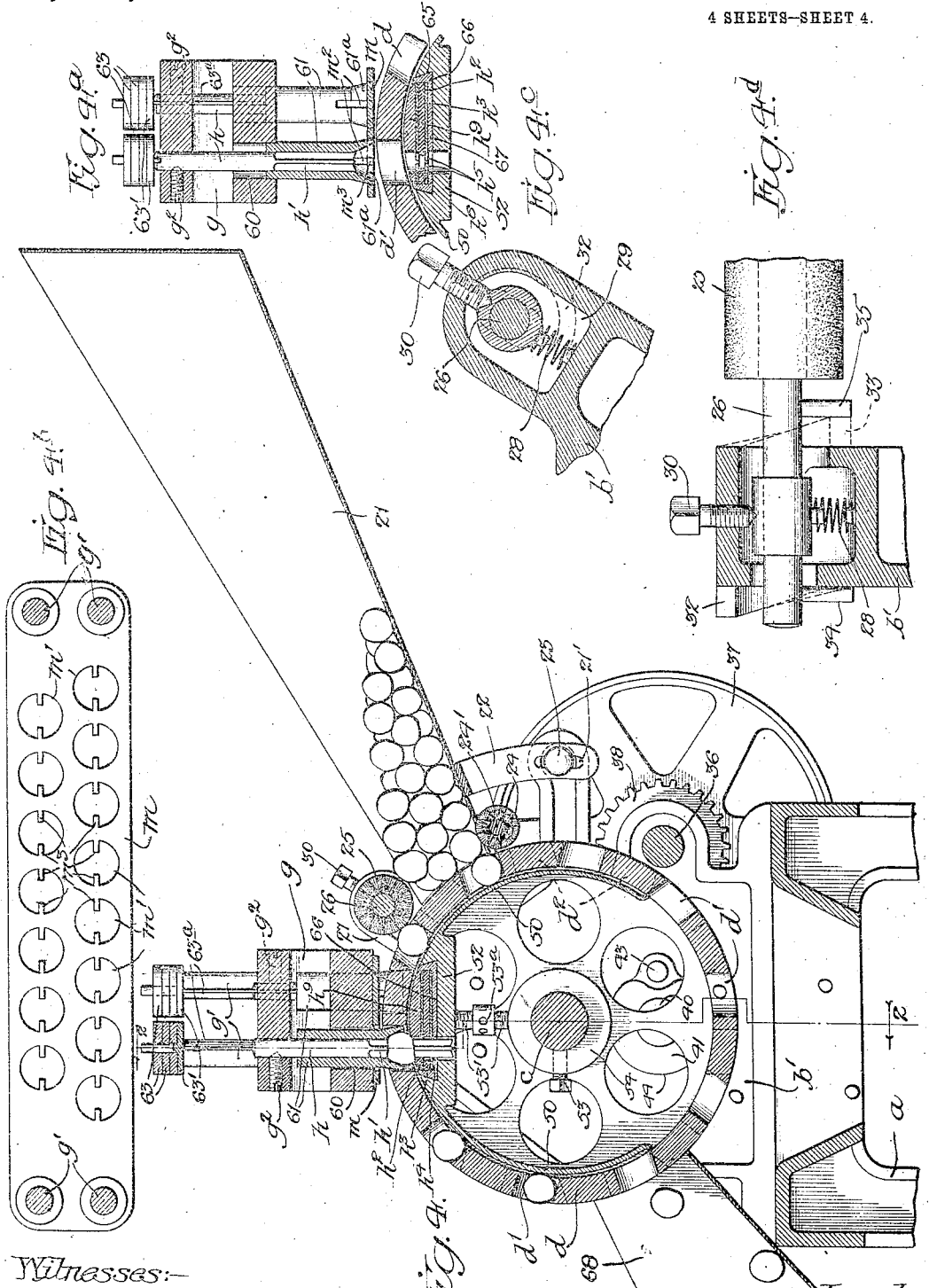

UNITED STATES PATENT OFFICE.

JOHN B. FOOTE, OF OAK PARK, ILLINOIS.

FRUIT-PITTING MACHINE.

1,024,564.  Specification of Letters Patent.  Patented Apr. 30, 1912.

Application filed May 26, 1910. Serial No. 563,610.

*To all whom it may concern:*

Be it known that I, JOHN B. FOOTE, a resident of Oak Park, in the county of Cook and State of Illinois, have invented certain new and useful Improvements in Fruit-Pitting Machines, of which the following is a full, clear, and exact description.

The invention relates to fruit pitting machines and designs more particularly to provide an improved machine, whereby cherries or similar fruit may be pitted in large quantities and of the type which is best adapted for canneries where fruit is handled in large quantities.

The invention designs to provide an improved pitting machine of large capacity.

The invention also designs to provide improved pitting mechanism in which the fruit will be positively centered with respect to the pitter-knife, so that despite any variation in size of the fruit, it will be centralized in position so the pits will be removed by the knife.

The invention also designs a machine of improved construction.

The invention consists in the several novel features hereinafter set forth and more particularly defined by claims at the conclusion hereof.

In the drawings: Figure 1 is a plan of a machine, embodying the invention. Fig. 1$^a$ is a perspective of the stationary support in the drum. Fig. 1$^b$ is a perspective of the die-carrier. Fig. 1$^c$ is a perspective of the elastic-die. Fig. 1$^d$ is a perspective of the slightly elastic strip beneath the elastic-die. Fig. 1$^e$ is a perspective of the metallic die-plate. Fig. 2 is a central longitudinal section, taken on line 2—2 of Fig. 4. Fig. 3 is an end elevation. Fig. 3$^a$ is a section on line 3$^a$—3$^a$ of Fig. 2. Fig. 4 is a section on line 4—4 of Fig. 1, the parts being shown in position assumed when the cross-head and parts carried thereby have been lowered. Fig. 4$^a$ is a similar view, parts being broken away, showing the parts in position assumed when the cross-head has been raised. Fig. 4$^b$ is a plan of the stripper-plate for preventing the fruit from sticking to the centering-sleeve. Figs. 4$^c$ and 4$^d$ are detail sections of one of the yielding bearings for supporting the rotary brush which prevents the cells from being over-loaded.

The frame-work of the machine is mounted on a suitable table or bed $a$ and comprises end-frames $b$ and $b'$ which are rigidly secured on the bed. A shaft $c$ is non-revolubly mounted and secured in the frames $b$, $b'$ by screws 15 and extends between the frames. A hollow drum $d$ is journaled on said shaft $c$ and comprises end-members $c'$, $c^2$ and a periphery or cylindrical face $c^3$ all rigidly secured together. The periphery of this drum is formed with longitudinal series of holes $d'$, $d^2$, one alternate series being relatively offset or staggered with respect to the holes of the other, and these holes serve as cells, each for individually receiving and carrying the fruit to the pitting mechanism. For the purpose of increasing the capacity of the machine, two rows or series of pitter-knives are provided, corresponding to two series of cells $d'$, $d^2$, so that during each stroke of the knives, the fruit in two series of cells will be pitted.

The fruit is fed to the drum by an inclined chute 21 which has secured thereto brackets 22, and screws 23 are adapted to pass through segmental slots 21' in these brackets to adjustably secure the chute in proper relative position to deliver the fruit to the cells in the drum and to permit the chute to be inclined more or less. The fruit, in bulk, is delivered into the chute, the bottom end of which is formed by the rotating drum, so that as the latter is revolving, longitudinal series of cells will be successively brought into position to receive the fruit, which falls into the cells by gravity. A rotary brush 24 extends across the bottom of the chute adjacent the drum to agitate the fruit so it will fall into and fill all the cells in the drum as they are successively brought into receiving position. A rotary brush 25 is provided between the chute 21 and the pitter-knives and is driven in such direction that it will dislodge one cherry from any cell, if perchance two small cherries should pass into it and will brush the extra cherry back into the chute. To render this brushing action more effective, the brush is operated longitudinally during rotation. The shaft 26 for brush 25 is mounted in bearings 27, one at each end of the machine, and these bearings are each yieldingly supported by a spring 28 disposed in a housing 29, formed on the end frames $b$, $b'$ respectively, and these springs position the bearings 27 against a set-nut 30, so that by adjusting said nuts, the brush may be adjusted relatively to the periphery of the drum $d$. Brush-shaft 26 is driven by a gear 31 at one end of said shaft and said gear is driven by mechanism hereinafter set forth. The brush-shaft is operated longitudinally during its rotation by oppositely disposed stationary cams 32 and 33 on the end-frame $b'$, which respectively engage studs 34 and 35 on the brush-shaft, so that during rotation of the shaft, the brush will be operated longitudinally back and forth to effectively remove the extra cherries from the cells in the drum and brush them back into the chute 21. By yieldingly supporting the brush and its shaft, the brush may be correctly positioned with respect to the drum according to the general size of the cherries being pitted. The agitator brush 24 is mounted on a shaft $24'$ which has secured to one of its ends, a gear $24^a$, which is driven as hereinafter described.

The drum is intermittently rotated to successively bring two series of cells beneath the rows of pitter-knives and to remain stationary during the pitting operations. This movement is effected by driving mechanism, which comprises a shaft 36 which is mounted in end-frames $b$, $b'$ and is driven by a pulley 37. Pinions 38 are secured to said shaft at the outer sides of the end-frames respectively, and each meshes with a gear-wheel 39 which is mounted on the outer side of one of the end-frames. One of these gear-wheels is secured to a short-shaft 40, which is journaled in the end-frame $b'$ and has secured to its inner end, a driving-pinion 41 for the drum. The other gear-wheel 39 is mounted on an idler-shaft 42 which is journaled in the end-frame $b$. The driving-pinion 41 is provided with a stud or tooth 43 and a concentric locking rim 44, and the stud is adapted to enter notches 45 in a gear-rim 46, which is secured to one end of the drum, and the locking-rim is adapted to engage correspondingly formed rim-portions 47 on said rim. During each rotation of the pinion, stud 43 will enter one of the notches 45 and rotate the drum one step, or a sufficient distance to bring the succeeding series of cells in the drum beneath the pitter-knives and after the drum has been thus shifted, the locking-rim 44 will engage a recess 47 on the gear-rim 46 and lock the drum against rotation during that period when the pitting operation occurs and the knives are removing the pits from the fruit. This mechanism provides simple means for intermittently driving the drum and locking it.

The cherries are held in the drum by a stationary support having a cylindrical wall 50, which is disposed in close proximity to the internal face of the drum. This support also forms a die-bed 52, and is adjustably mounted on the fixed shaft $c$, by screws $53'$ which are secured in and extended into collars 54 on said shaft, and which extend into and are secured in the die-bed, and screw-collars $53^a$ whereby the support may be raised or lowered. By adjusting these collars the support, whereon the cherries are held during the pitting operation, may be adjusted to and from the drum to vary the depth of the cells according to the general size of the cherries being pitted.

A double series of pitter-knives $h$ is provided corresponding in number and arrangement to a double series of cells in the drum, so that during each operation of pitter-knives, all of the fruit in a double series of cells, will be pitted. These pitter-knives are disposed above the drum and are secured by screws $g^2$ in a cross-head $g$, which is slidably mounted on guide-rods $g'$ which are secured in the end-frames. This cross-head is reciprocated vertically to operate the pitter-knives by pitmen 56 which are pivotally connected at their upper ends, as at 57, to the cross-head and are operatively connected by wrist-pins 58 to gear-wheels 39 which are continuously driven by pinion 38. Each pitter-knife $h$ has its lower end $h'$ ribbed and formed to pierce the fruit and engage the pit and remove it therefrom.

A fruit-centering sleeve 61 is disposed on each pitter-knife and is slidably mounted in the cross-head relatively to the pitter-knife, being held in a guide 60 formed in the cross-head. The lower end of this sleeve extends normally below the lower end of the knife to engage the fruit in advance of the knife and is provided with a flared mouth $61^a$, which is adapted to enter the cell in the drum in which the fruit is held and to positively center it relatively to the knife, so that despite irregularity in the shape or size of the fruit, it will be positioned so that when the knife passes through it, the pit will be disposed in the path of the knife and be removed thereby. I am aware that it has heretofore been the practice to provide a flared cell for holding a cherry during the pitting operation, but have found that by supporting a cherry in a cell, independently of the centering device, and forcing it against a supported cherry or toward it, the fruit will be more effectively centered despite variation in shape or size, whereas if the flared element is employed to support the fruit, and the size and shape of the cherry are such as to prevent the cherry from being firmly supported beneath the knife, the pit may escape the knife. Furthermore, when flared cells are used in a rotating element, a high speed sometimes dislodges the cherries from the cells. For these reasons, the firm support opposing a flared centering device, which engages the cherries on the support and positions them relatively to the knife, is an important feature of the invention. Each centering sleeve 61 is held downwardly against the fruit by adjustable weights 63 which are mounted on rods $63^a$ which extend upwardly from the sleeve and through the upper wall of the cross-head $g$. This construction permits the sleeve to remain stationary when the cherry has been centered and the knife is being driven therethrough. The upper end of each knife engages the lower weight $63'$ to lift the sleeve out of the cell in the drum, after each pitting operation. Weight $63'$ is secured to rods $63^a$ and has a stem adapted to receive the number of weights desired. The die-bed 52 is provided with a longitudinally extending channel 65 in which a die-carrier 66 is removably held. This die-carrier is provided with a longitudinal channel 67 in which the die-strips are held. A backing-strip $h^4$, strips $h^3$, $h^2$, and a top-plate $h^0$ are superposed in the die-carrier. The die-bed 52 and plate $h^0$ are each provided with openings centrally disposed beneath the knives and corresponding to a double series of cells in the drum, through which the pitter-knives pass, and these openings are of sufficient size to permit the pits to pass therethrough as the knives eject them from the fruit. The elastic die-strip $h^2$ is formed of thin live rubber and is provided with an opening $h^6$ corresponding substantially to the shape of the knife and one for each knife in the series. Strip $h^3$ is formed of harder rubber and supports the live rubber strip $h^2$. Said strip is provided with an opening somewhat smaller than is necessary for the knife and pit, so that the latter, in being forced through said opening, will be separated from the pulp and fiber of the fruit. In practice, it has been found that thin elastic dies, such as the strip $h^2$, in pitting machines, frequently become worn, the die-bed usually having an opening therein of sufficient size to permit the pit to pass therethrough, so that the inwardly extending tongues, which fit between the ribs of the knife to hold the fruit, have no direct support. To overcome the necessity of frequent replacement of these dies, the rubber backing $h^3$ is employed. A metallic backing-strip $h^4$ is placed beneath each of the flexible dies, and has openings corresponding in shape to the openings in the elastic die, so that metallic tongues $h^5$ are provided. This backing-strip is made of spring metal, so that as the pit is driven therethrough by the knife, any pulp or fiber adhering to the pit, will be held back by these tongues if the rubber dies fail to hold it. By these devices, the pits are separated cleanly from the pulp and fiber of the fruit.

A stationary stripper-plate $m$ is secured in guide-rods $g'$ and has holes $m'$ therein, through which the lower ends of the centering-sleeve pass when the latter are lowered. Each sleeve 61 has slots $m^2$ in its lower end into which project, teeth $m^3$ on the stripper-plate, so that when the sleeve is raised out of the cell in the drum, the pitted fruit will be prevented from sticking in the flared mouth of the sleeve and caused to remain in the cell. The pitted fruit remains in the cells of the intermittently rotating drum, and is carried away from the dies and delivered into a discharge chute 68 which conducts them to a suitable receptacle, being held against dropping out of the cells by a wall 50 on the stationary support in the drum. The pits removed from the fruit fall through the openings in the bottom portion of the drum, and into a suitable receptacle beneath the table $a$. Brush 25 is driven by an idler-gear 70 which meshes with the gear 39 at one end of the machine and with pinion 31 on the brush-shaft. Pinion $24^a$ on the shaft of brush 24 also engages idler 70 to drive said brush.

The operation of the improved machine will be as follows: The fruit to be pitted is dumped into chute 21. A double series of cells $d'$, $d^2$ in the drum $d$ will be simultaneously disposed adjacent the lower end of the chute, so that the cherries will fall into said cells and be held therein by the stationary wall 50 in the drum. Rotating brush 25 will hold back the cherries in the chute and sweep out the extra cherries, if any are held in the cells in the drum, and the lower brush 24 agitates the fruit, so it will fill the cells. The staggered or offset relation of the cells of one row with respect to the next, will facilitate the passage of the fruit into the cells. The drum will be intermittently advanced step by step by the gear-mechanism, including pinion 41 and gear-ring 46. After a double series of cells $d'$, $d^2$, each with a cherry therein, has been brought into position beneath the pitter-knives, the drum will be locked against rotation and the cross-head $g$ will be lowered by pitmen 56 and gears 39, which are continuously driven, the drum being advanced during that period when the pitter-knives and centering-sleeves have been withdrawn from the drum. As the cross-head is lowered, the centering-sleeve will enter the cells in the drum and the cherries will be centered on plate $h^0$ by the flared lower terminals of said sleeves, in advance of the knives. When the sleeves are seated on the cherries and the movement of the cross-head continues, the sleeves will be arrested and the pitter-knives will be driven through the cherries, the lower end of the knives engaging the pits in the cherries and forcing them through the openings in the plates and dies in the drum. In passing through the elastic die $h^2$, backing-strip $h^3$ and the plate $h^4$, the pit will be cleanly separated from the pulp and driven into the drum. During the reverse movement of the cross-head, the knives will be withdrawn from the pitted cherries which will then be held against upward movement with the centering-sleeves by the stripper-plate $m$, and when the knives have been withdrawn, the sleeves and knives will be carried upward together by the cross-head and withdrawn from the fruit in the cells in the drum. The drum will then be again advanced a sufficient distance to bring the next double loaded series of cells into position beneath the pitter-knives. The pitted cherries will be in the cells, until discharged from the drum into chute 68 and the pits will drop through the cells in the lower portion of the drum.

It will thus be seen that the improved machine is well adapted for pitting large quantities of cherries and feeding them from a hopper containing the cherries in bulk to a gang of simultaneously operating pitter-knives and that the construction of the mechanism is such that a machine may be driven at high speed to increase its capacity without causing the cherries to be dislodged from the cells, and by keeping the drum locked by the gear-mechanism which drives it, there is no danger of overthrow or failure of the several mechanisms of the machine to operate synchronously. By providing an abutment in the cell for the cherry in the cells and bringing said abutment and centering device together, the cherries will be more accurately centered and disposed with respect to the pitter-knives, despite variation in the size and shape of the cherries, so that the possibility of a knife passing through the fruit, without removing the pit, will be effectively overcome. The improved brush for holding back the cherries in the chute and permitting only a single cherry to remain in each cell, also tends to make possible the rapid operation of the machine to increase its capacity.

The invention is not to be understood as restricted to the details shown and described, since these may be modified within the scope of the appended claims, without departing from the spirit and scope of the invention.

Having thus described the invention, what I claim as new and desire to secure by Letters Patent, is:

1. In a pitting machine, the combination of a drum having series of cells longitudinally disposed therein, the cells of alternate series being off-set or staggered with respect to the cells of the adjacent series, a receptacle for containing fruit in bulk and disposed to deliver the fruit onto the drum so that the fruit will fall into the cells as the drum is rotated, knives for removing the pits from the fruit in the cells, and mechanism for operating said knives.

2. In a pitting machine, the combination of a drum having series of cells longitudinally disposed therein, the cells of alternate series being off-set or staggered with respect to the cells of the adjacent series, a receptacle for containing fruit in bulk and disposed to deliver the fruit onto the drum so that the fruit will fall into the cells as the drum is rotated, a plural series of knives for removing the pits from the fruit in the cells, and mechanism for operating said knives.

3. In a pitting-machine, the combination of a drum having a plural series of cells therein, mechanism for rotating the drum, a plural series of knives, the series of knives being in staggered relation to one another, the series of cells being correspondingly disposed in the drum, a stationary die in the drum through which the knives pass, and mechanism for operating the plural series of knives to simultaneously remove the pits from corresponding series of cells in the drum.

4. In a pitting-machine, the combination of a drum having a series of bottomless cells therein, a stationary support within the drum for holding the fruit in the cells, pitter-knives for removing the pits from the fruit in the cells, mechanism for rotating the drum, and mechanism for operating the knives.

5. In a pitting-machine, the combination of a drum having a series of bottomless cells therein, a stationary support within the drum for holding the fruit in the cells, pitter-knives for removing the pits from the fruit in the cells, mechanism for rotating the drum, mechanism for operating the knives, and means for delivering the fruit to the cells in the drum.

6. In a pitting-machine, the combination of a rotatable drum, a die-support therein, means for adjustably sustaining the support to or from the drum, said drum having cells therein, pitter-knives for removing the pits from the fruit in the cells, a die in the drum and carried by said support, mechanism for rotating the drum, and mechanism for operating the knives.

7. In a pitting-machine, the combination of a rotatable drum having cells therein, a stationary support in the drum, pitter-knives, means at one side of the drum for delivering fruit into the cells, a stationary wall in the drum for holding the fruit in the cells until it has been delivered to the knives, mechanism for rotating the drum, and mechanism for operating the knives.

8. In a pitting-machine, the combination of a rotatable drum having cells therein, a stationary support in the drum, pitter-knives, means at one side of the drum for delivering fruit into the cells, a stationary wall in the drum for holding the fruit in the cells until it has been delivered to the knives, a wall within the drum for holding the pitted fruit in the cells until it has been carried to the opposite side of the drum, mechanism for rotating the drum, and mechanism for operating the knives.

9. In a pitting-machine, the combination of means provided with a cell, a flared element for engaging the fruit, a substantially flat abutment for the fruit opposed to said flared element, a pitter-knife, means for causing the pitter-knife to pass through the fruit, and means for bringing said abutment and said flared centering device toward each other.

10. In a pitting-machine, the combination of means provided with a cell, a substantially flat abutment for the fruit in the cell, a flared sleeve for engaging the fruit on the abutment, a pitter-knife, means for causing the pitter-knife to remove the pits from the fruit held between said sleeve and said abutment, and means for bringing the sleeve and abutment toward each other.

11. In a pitting-machine, the combination of means having a cell therein, a substantially flat abutment for holding the fruit in the cell, a flared centering device adapted to enter the cell, a pitter-knife, means for operating the knife to pass through the fruit held between the centering device and said abutment, and means for bringing the centering device and said abutment toward each other with the fruit therebetween, so it will be centered relatively to the knife before the latter passes through the fruit.

12. In a pitting-machine, the combination of means provided with a cell, a substantially flat abutment for holding the fruit in the cell, a flared centering sleeve adapted to enter the cell, a pitter-knife extending through said sleeve, means for operating the knife to pass through the fruit held between the centering device and said abutment, and means for bringing the centering device and said abutment toward each other with the fruit therebetween, so it will be centered relatively to the knife before the latter passes through the fruit.

13. In a pitting-machine, the combination of means provided with a cell, a flared element for engaging the fruit, an abutment for the fruit opposed to said flared element, a pitter-knife, means for operating the pitter-knife, means for bringing said abutment and said flared centering device toward each other, and means for causing the fruit to be stripped from the centering device.

14. In a pitting-machine, the combination of means provided with a cell, an abutment for the fruit in the cell, a flared sleeve for engaging the fruit on the abutment, a pitter-knife, means for operating the pitter-knife to remove the pits from the fruit, means for operating the pitter-knife through the fruit held between said fruit and said abutment, means for bringing the sleeve and abutment toward each other, and a stripper for preventing the fruit from remaining in the sleeve.

15. In a pitting-machine, the combination of means having a cell therein, an abutment for holding the fruit in the cell, a flared centering device adapted to enter the cell, a pitter-knife, means for operating the knife to pass through the fruit held between the centering device and said abutment, means for bringing the centering device and said abutment toward each other with the fruit therebetween, so it will be centered relatively to the knife before the latter passes through the fruit, and a stripper for preventing the fruit from remaining in the centering device as it is separated from the abutment.

16. In a pitting-machine, the combination of means provided with a cell, an abutment for holding the fruit in the cell, a flared centering sleeve adapted to enter the cell, a pitter-knife extending through said sleeve, means for operating the knife to pass through the fruit held between the centering device and said abutment, means for bringing the centering device and said abutment toward each other with the fruit therebetween, so it will be centered relatively to the knife before the latter passes through the fruit, and a stationary stripper for preventing the fruit from remaining in the centering device as it is separated from the abutment.

17. In a pitting-machine, the combination of means having cells therein, a substantially flat abutment for holding the fruit in the cells, a yielding centering device adapted to enter the cells to center the fruit on said abutment, a pitter-knife extending through said centering device, mechanism for operating the knife, and means for causing the centering device to move into the cell in advance of the knife.

18. In a pitting-machine, the combination of a fixed support, having a substantially flat surface for supporting the fruit, a rotatable element having cells therein moving over said support, a centering-sleeve having a flared mouth adapted to enter the cell to engage fruit held on said abutment, a pitter-knife extending through said centering device, mechanism for rotating said element, mechanism for operating the knife, and means for causing the sleeve to engage the fruit in the cells in advance of the knife.

19. In a pitting machine, the combination of a rotatable element having cells therein, means within said element for supporting the fruit in the cells, a centering sleeve having a flared mouth adapted to enter the cell to engage the supported fruit, a pitter-knife extending through said sleeve, mechanism for rotating said element, mechanism for operating the knife through said cells, said sleeve being slidably connected to the knife, and means for causing the sleeve to engage the fruit in advance of the knife.

20. In a pitting-machine, the combination of a drum having cells therein, means at one side of said drum for delivering fruit to said cells, a brush for removing excess fruit from said cells, mechanism for rotating said brush and operating it longitudinally, and mechanism for driving said drum.

21. In a pitting-machine, the combination of a drum having cells therein, a receptacle at one side of the drum for delivering fruit to the cells, pitter-knives above the drum, a brush in and forming part of the bottom of said receptacle and adjacent the drum, mechanism for rotating the brush, mechanism for driving the drum, and mechanism for operating the pitter-knives.

22. In a pitting machine, the combination of a drum having cells therein, a receptacle at one side of said drum for delivering fruit to the cells, a brush in and forming part of the bottom of said receptacle adjacent the drum, a brush above the receptacle, mechanism for rotating said brushes, and mechanism for driving said drum.

23. In a pitting-machine, the combination of an element having a cell therein, a ribbed pitter-knife, an elastic die having an opening therein corresponding to the shape of the knife, a metallic die having an opening corresponding to the shape of the knife with resilient tongues therein, and mechanism for operating the knife to pass through the fruit and said dies.

24. In a pitting-machine, the combination of an element having a cell therein, a ribbed pitter-knife, an elastic die having an opening therein corresponding to the shape of the knife, an elastic backing for said die of harder material and having a restricted opening therein, a metallic die having an opening corresponding to the knife and resilient tongues, and mechanism for operating the knife.

25. In a pitting-machine, the combination of means provided with a cell, a flared element for engaging the fruit, an abutment for the fruit, opposed to said flared element, a pitter-knife, means for bringing said abutment and said flaring centering device together, said flared element having a slot therein and means extending into said slot to prevent the fruit from remaining in the sleeve.

26. In a pitting-machine, the combination of means provided with a cell, a flared element for engaging and centering the fruit, an abutment for the fruit, opposed to said flared element, a pitter-knife, means for bringing said abutment and said flaring centering device together, said element having a slot therein, and means having an opening therein through which the sleeve is adapted to pass and adapted to extend into said slot to engage the fruit and prevent it from remaining in the sleeve as the latter is withdrawn from the cell.

27. In a pitting-machine, the combination of a drum provided with cells, flared sleeves adapted to enter said cells and for engaging the fruit and having slots therein, abutments opposed to said flared element for holding the fruit in the cells, pitter-knives, means for operating the pitter knives, means for operating said sleeves into and out of the cells, and a plate having openings therein through which the sleeves and knives are operated and having means thereon adapted to extend through slots in the flared sleeve to engage the fruit and prevent it from remaining in the sleeves.

28. In a pitting-machine, the combination of means provided with a cell having substantially parallel sides, extending from the top to the bottom thereof, a flared centering sleeve, fitting into said cell, a substantially flat abutment, a pitter-knife, means for causing the pitter-knife to remove the pits from the fruit held between said sleeve and said abutment, and means for bringing the sleeve and abutment together.

29. In a pitting-machine, the combination of means provided with a cell having substantially parallel sides extending from the top to the bottom thereof, a flared centering sleeve fitting into said cell, a substantially flared abutment forming the bottom of the cell, a pitter-knife and elastic die, means for causing the pitter knife to remove the pits from the fruit held between said sleeve and said abutment, and means for bringing the sleeve and abutment together.

JOHN B. FOOTE.

Witnesses:
HILDUR C. PETERSEN,
FRANK W. BEMM.